United States Patent
Balaun

Patent Number: 5,957,093
Date of Patent: Sep. 28, 1999

[54] PIEZOELECTRIC DOG TRAINER

[76] Inventor: Daniel M. Balaun, 5023 SW. 26th St., Topeka, Kans. 66614

[21] Appl. No.: 09/059,261

[22] Filed: Apr. 14, 1998

Related U.S. Application Data

[60] Provisional application No. 60/043,732, Apr. 18, 1997.

[51] Int. Cl.$^6$ .......................... A01K 27/00; A01K 15/00
[52] U.S. Cl. ................................. 119/859; 119/908
[58] Field of Search .................... 119/792, 795, 119/859, 908

[56] References Cited

U.S. PATENT DOCUMENTS

| | | | |
|---|---|---|---|
| 2,023,950 | 12/1935 | Carter | 119/792 |
| 4,488,511 | 12/1984 | Grassano | 119/798 |

FOREIGN PATENT DOCUMENTS

| | | | |
|---|---|---|---|
| 3300486 | 7/1984 | Germany | 119/859 |
| 8004998 | 4/1982 | Netherlands | 119/908 |

*Primary Examiner*—Robert P. Swiatek
*Assistant Examiner*—Son T. Nguyen
*Attorney, Agent, or Firm*—Chenpatents

[57] ABSTRACT

A piezoelectric dog trainer is a small enclosed shell containing a piezoelectric element with a push button attached to a slidable loop. The opposite end of the loop extending outside of the shell is attached to a dog's collar where two electrodes leading from the piezoelectric element are attached. On the back end of the trainer there is attached a leash. When the dog pulls on the leash or the leash is tightened, a shock is generated on the dog's neck.

12 Claims, 2 Drawing Sheets

PIEZOELECTRIC DOG TRAINER

This application claims the priority of the provisional application No. 60/043,732 filed on Apr. 18, 1997.

BACKGROUND OF THE INVENTION

1. Field of Invention

This invention is directed to a dog training device. In particular, it provides control of a dog's movement by means of a piezoelectric element administering a weak electric shock to the dog's neck via its collar.

2. Prior Art Discussion

Dog training devices administering electric shocks are not new. U.S. Pat. No. 2,023,950 discloses using batteries to produce a shock on the dog's neck when a button is pushed. U.S. Pat. No. 3,540,823 discloses piezoelectric spark generators for lighting liquid fuel. The invention of this patent lies in moving the piezoelectric element against a stationary impact means.

Thus far, there has been nothing on the market or in the prior art relating to a dog trainer using piezoelectric control. There is a need for such device. The dog trainer according to the present invention employs a piezoelectric element as a stationary part and a movable impact means, such as a push button, to generate a voltage difference between two spaced electrodes when the dog lunges ahead or when the leash is pulled back by the person who walks the dog. This device can be used to control the dog's pace. It also serves a warning signal to the dog should the dog's behavior become unruly. It is convenient to use and economical since there are no batteries that need replacing.

SUMMARY OF THE INVENTION

The piezoelectric dog training device of this invention is an elongated enclosure which comprises two molded plastic half shells. A piezoelectric element is disposed within the shell. A rigid elongated wire or metal loop is slideably placed within a pair of parallel grooves in the shell and extending outside the shell at the front end thereof. The extended loop is detachably hooked on the collar of the dog. The opposing end of the wire loop is fixed on a push button of the piezoelectric element. At the back end of the shell, there is an aperture which is integral with the shell for attaching the leash. When the dog pulls on the wire loop by way of the collar, the wire loop compresses the push button on the piezoelectric element, thereby generating an electric shock at the spaced electrodes on the collar around the neck of the dog. When the leash is pulled by a person, the effect is the same.

DETAILED DESCRIPTION OF THE INVENTION

Figure 1:
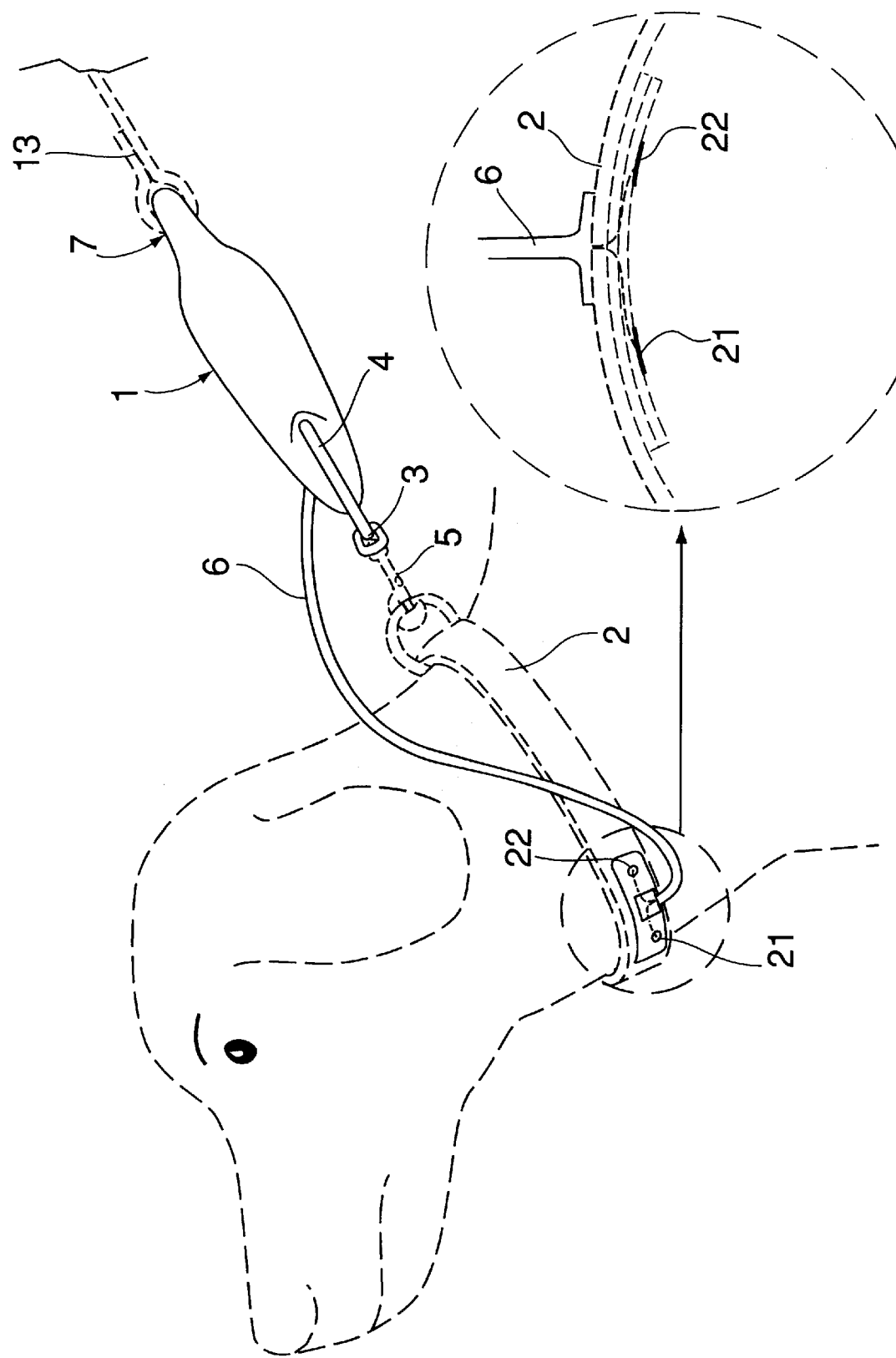
FIG. 1 shows the dog trainer of this invention attached to a collar of a dog and a leash on the other end.

As shown in FIG. 1, the dog trainer of this invention has a hollow elongated body 1. A slidable wire loop 4 protruding from the shell body 1 is attached at the front end 3, to a collar 2 of a dog by a clip 5 or other suitable means. The collar, clip and leash do not form part of the invention. A wire conduit 6, leading from the body 1 is connected to two electrodes 21 and 22. The electrodes are attached to the inside of the collar 2 and are in contact with the neck of the dog. At the opposing end of the body 1, there is provided an aperture 7 for connecting to the leash 13.

Figure 2:
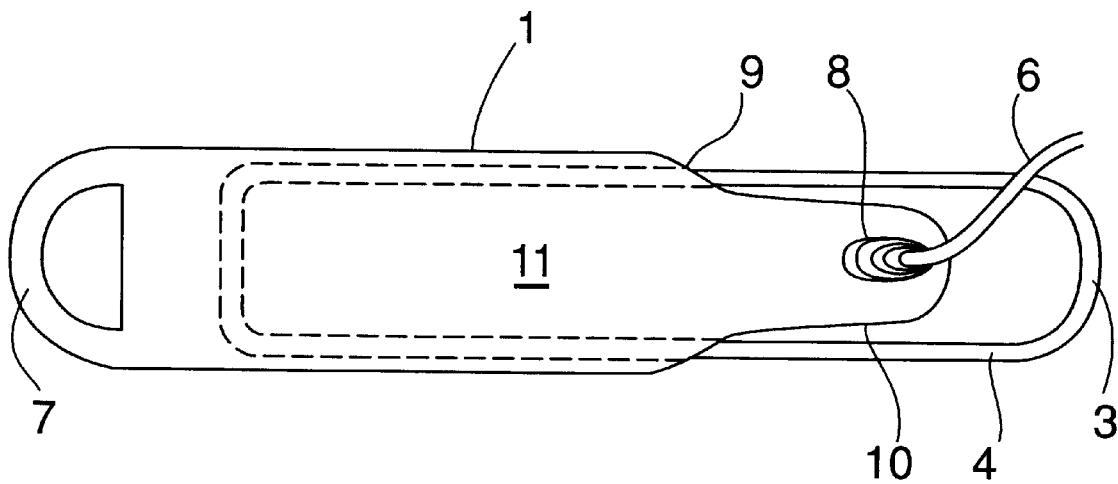
FIG. 2 is a top view of the dog trainer.
Figure 3:
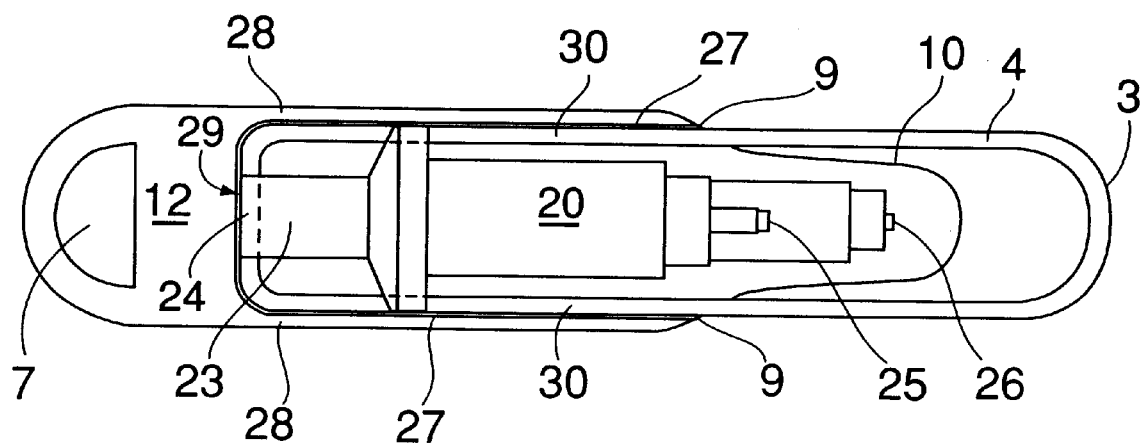
FIG. 3 is an exploded view of the dog trainer.

FIG. 2 shows a top view of the body 1 of the dog trainer. The body 1 is an elongated hollow container formed from two half shells, one being a top shell 11 and the other half, 12, not visible in FIG. 2. These shells are hollow molded plastic having a groove 27, longitudinally molded into two opposite walls 28 of the shell 1 as shown in FIG. 3. The two shells 11 and 12 can be sealed as one to house a piezoelectric element 20 including the impact means, 23, electric wires, etc., as shown in FIG. 3. As seen from FIG. 2, the elongated shell body 1 has the shape of a bottle with the smaller diameter in front. The back portion of the body 1 provides an aperture 7 as described above for attachment of the leash 13. The elongated loop 4, made of hardened steel wire or aluminum tubing protrudes out of the shell body 1 at shoulders 9 where the shell 1 decreases in size. The front end 3 of the loop 4 is connected to the dog collar 2 as shown in FIG. 1. The wire conduit 6 leading from the front portion of shell 1 consists of two insulated wires terminating in two electrodes, 21 and 22, which are installed in or attached to the inside of the dog collar 2 and in direct contact with the dog's neck. The electrodes are spaced about 2 inches from each other.

The body 1 is about 5" long and 1.25" in diameter. The front portion 10 of the body 1 is about 0.625" in diameter. The loop 4 exits the shell 11 at shoulders 9 and 9a and extends beyond the front portion 10 of the shell body 1 by about 0.75". The invention is not to be limited to these dimensions. The electric conduit 6 provides a strain relief boot 8 to protect wire connections from damage.

FIG. 3 is an exploded view of the lower half shell 12 containing a piezoelectric element 20, which is commercially available. The piezoelectric unit can be a push-button type or other type of impact means to generate a voltage which causes a spark at the electrodes 21 and 22. The voltage generated is about 10,000 volts.

A movable impact means 23 has a slot 29 snugly fitted to the back end 24 of loop 4. The back end 24 is preferably rectangular in order to fit into the slot 29. Any other means of fixing the impact means 23 to the back end 24 of the loop 4 may be used. Impact means 23 preferably is a push button to exert a pressure or impact on the piezoelectric element 20, thereby generating a voltage difference between the electrodes 21 and 22, giving a slight electric shock to the dog. Electric contacts 25 and 26 are connected through two insulated wires contained in wire conduit 6. The wires terminated at the electrodes 21 and 22, which are spaced about 2" apart and are in contact with the dog's neck as shown in an enlarged view in FIG. 1.

Wire loop 4 has two elongated parallel sections 30, a rectangular back end 24, and a round front end 3. Shell 12 has two opposing grooves 27, longitudinally molded onto the interior of two opposing side walls 28. The grooves 27 exit through the shell 12 and terminating at shoulders 9 where the diameter of the shell 1 decreases. The loop 4 slides in and out the shell body by placing the section 30 in the parallel molded grooves 27 of shell 12. The loop 4 extends beyond the front portion 10 and moves freely without obstruction in view of the smaller size of front portion 10. When the dog wearing the dog trainer lunges forward, the back end portion 24 of loop 4 is pulled forward and causes the impact means 23 to strike the piezoelectric element, thereby generating a potential difference between the electrodes, resulting in an electric shock to the dog's neck. The same sequence of events takes place when the dog walker pulls the leash. The above configuration is preferred. However, a stream-lined body with the grooves running through the entire length of the body and protruding from the front end will equally work well.

While the invention has been described in terms of a specific preferred embodiment, it is understood that it is capable of further modification and adaptation of the invention following in general the principle of the invention and including such departures from the present disclosures as come within the known or customary practice in the art to which the invention pertains and may be applied to the central features set forth, and fall within the scope of the invention and of the limits of the appended claims.

I claim:

1. A piezoelectric dog trainer comprising a hollow elongated shell having two opposing parallel grooves in the interior of its side walls, said grooves exiting through and terminating at the side walls adjacent to its front portion of the shell and leash attachment means disposed at back portion thereof;

a piezoelectric element having a movable impact means at the back end thereof and two electric contacts at the front end thereof, said element being disposed within said hollow shell; said electric contacts being wired to a pair of electrodes; and loop means having a back end, a front end and a pair of parallel mid-portions, said mid-portion being slidably fitted into said grooves for free movement in and out of said shell; said impact means being fastened to the back end of the loop means for pushing said impact means forward thereby causing the piezoelectric element to generate a voltage difference between the electrodes.

2. The piezoelectric dog trainer of claim 1 wherein the hollow shell is made of two half shells, an upper shell and a lower shell.

3. The piezoelectric dog trainer of claim 1 wherein the hollow shell is made of molded plastic.

4. The piezoelectric dog trainer of claim 1 wherein the movable impact means is a push button.

5. The piezoelectric dog trainer of claim 4 wherein the back end of the loop means is rectangular and said push button has a slot and said rectangular end is, snugly fitted into the slot for urging said push button forward, when the loop means is pulled forward.

6. The piezoelectric dog trainer of claim 4 wherein the back end of the loop means is rectangular and said push button has a slot and said rectangular end fit into the slot for urging said push button, when a leach is being pulled.

7. The piezoelectric dog trainer of claim 1 wherein the loop means is a hardened steel wire.

8. The piezoelectric dog trainer of claim 1 wherein the loop means is an aluminum tube.

9. The piezoelectric dog trainer of claim 1 wherein the shell has a smaller front portion than the remaining body.

10. The piezoelectric dog trainer of claim 1 wherein the leash attaching means is an aperture in the back portion of the shell.

11. The piezoelectric dog trainer of claim 1 wherein the electric contacts are wired through an electric conduit having a strain relief boot on the outside wall of the shell.

12. A method of training a dog by attaching the device of claim 1 at the front end of the loop means to a dog collar and attaching said electrodes spaced apart on the inside of the collar touching the neck of the dog.

* * * * *